(12) United States Patent
Takagi et al.

(10) Patent No.: US 10,859,899 B2
(45) Date of Patent: Dec. 8, 2020

(54) WAVELENGTH CONVERSION ELEMENT, METHOD FOR PRODUCING WAVELENGTH CONVERSION ELEMENT, LIGHT SOURCE DEVICE, AND PROJECTOR

(71) Applicant: SEIKO EPSON CORPORATION, Tokyo (JP)

(72) Inventors: Kunihiko Takagi, Okaya (JP); Kunihiko Yano, Shiojiri (JP); Tomohiro Yokoo, Matsumoto (JP); Wataru Yasumatsu, Azumino (JP); Tetsuo Shimizu, Matsumoto (JP); Shinichi Yotsuya, Chino (JP); Koya Shiratori, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/050,125

(22) Filed: Jul. 31, 2018

(65) Prior Publication Data

US 2019/0041733 A1 Feb. 7, 2019

(30) Foreign Application Priority Data

Aug. 3, 2017 (JP) .................. 2017-150599
Dec. 25, 2017 (JP) .................. 2017-247872

(51) Int. Cl.
*G03B 21/20* (2006.01)
*C03C 17/36* (2006.01)
(Continued)

(52) U.S. Cl.
CPC .............. *G03B 21/204* (2013.01); *C03C 8/24* (2013.01); *C03C 17/3618* (2013.01);
(Continued)

(58) Field of Classification Search
CPC ..... G03B 21/204; G02B 26/008; G02B 1/115; C09K 11/00; C09K 11/08; F21V 9/02;
(Continued)

(56) References Cited

U.S. PATENT DOCUMENTS

| | | | | |
|---|---|---|---|---|
| 2010/0014163 A1* | 1/2010 | Morimoto | ............... | G02B 1/116 359/585 |
| 2010/0226005 A1* | 9/2010 | Nishimoto | ............. | G02B 1/115 359/359 |
| 2012/0070673 A1* | 3/2012 | Kuntz | ...................... | C09D 7/67 428/446 |
| 2014/0203318 A1* | 7/2014 | Matsui | .................... | H01L 33/60 257/98 |
| 2015/0316233 A1* | 11/2015 | Kawamata | ........... | G02B 5/0858 362/317 |

(Continued)

FOREIGN PATENT DOCUMENTS

JP 2006-317603 A 11/2006
JP 2007-007982 A 1/2007
(Continued)

*Primary Examiner* — Michelle M Iacoletti
*Assistant Examiner* — Christopher A Lamb, II
(74) *Attorney, Agent, or Firm* — Oliff PLC

(57) ABSTRACT

A wavelength conversion element includes a wavelength conversion layer which has a first face on which an excitation light is incident and a second face facing the first face, a first layer which is provided facing the second face and contains a first inorganic oxide, a second layer which is provided facing the first layer and contains a first metal or a second inorganic oxide that is different from the first inorganic oxide, and a third layer which is provided facing the second layer, contains either silver or aluminum, and reflects the excitation light or a light obtained by wavelength conversion of the excitation light by the wavelength conversion layer.

18 Claims, 6 Drawing Sheets

(51) Int. Cl.
*C03C 27/00* (2006.01)
*C03C 8/24* (2006.01)

(52) U.S. Cl.
CPC ...... *C03C 17/3644* (2013.01); *C03C 17/3649* (2013.01); *C03C 17/3657* (2013.01); *C03C 27/00* (2013.01); *C03C 2218/152* (2013.01)

(58) Field of Classification Search
CPC ..... F21V 9/06; F21V 9/08; F21V 9/30; F21V 9/32; F21V 9/35; F21V 9/38; F21V 9/40; F21V 9/45; F21V 13/14; F21V 13/08; G02F 2001/133614; H01L 33/50; C03C 17/3618; C03C 17/3649; C03C 17/3644; C03C 17/3657; C03C 27/00; C03C 8/24; C03C 2218/152; H01J 29/896
See application file for complete search history.

(56) References Cited

U.S. PATENT DOCUMENTS

| | | | |
|---|---|---|---|
| 2016/0077415 A1* | 3/2016 | Motoya | G03B 21/204 353/84 |
| 2016/0377967 A1* | 12/2016 | Ando | G02B 26/008 362/84 |
| 2018/0080615 A1 | 3/2018 | Inoue et al. | |

FOREIGN PATENT DOCUMENTS

| | | |
|---|---|---|
| JP | 2007-310335 A | 11/2007 |
| JP | 2015-119046 A | 6/2015 |
| JP | 2016-192295 A | 11/2016 |
| WO | 2015194455 A1 | 12/2015 |
| WO | 2017-119335 A1 | 7/2017 |

\* cited by examiner

WAVELENGTH CONVERSION ELEMENT, METHOD FOR PRODUCING WAVELENGTH CONVERSION ELEMENT, LIGHT SOURCE DEVICE, AND PROJECTOR

BACKGROUND

1. Technical Field

The present invention relates to a wavelength conversion element, a method for producing a wavelength conversion element, a light source device, and a projector.

2. Related Art

Recently, as a lighting device for a projector, there is a device utilizing fluorescence as an illumination light. For example, JP-A-2015-119046 (Patent Document 1) discloses a light emitting device including a light source which emits a laser beam and a fluorescence emitting section which emits fluorescence by incidence of the laser beam. In this light emitting device, the fluorescence emitting section includes a phosphor layer, a substrate which supports the phosphor layer, and a reflection layer which is provided between the substrate and the phosphor layer. The fluorescence emitting section extracts fluorescence generated by the phosphor layer as an illumination light by reflecting the fluorescence by the reflection layer.

As the reflection layer as described above, a reflection layer having excellent durability is desired. For example, WO 2015/194455 (Patent Document 2) discloses that an Ag film is used as a reflection layer which is resistant to heat and light.

Therefore, it is also considered that an Ag film is used as a reflection layer which reflects fluorescence generated by a phosphor layer. However, in the case where an Ag film is used as a reflection film which reflects fluorescence, Ag aggregates due to heat or light in the phosphor, and the film becomes nonuniform, resulting in a decrease in reflectance, and thus, the fluorescence extraction efficiency is decreased. Further, the durability of the reflection film is also decreased.

SUMMARY

An advantage of some aspects of the invention is to provide a wavelength conversion element, in which a decrease in fluorescence extraction efficiency is suppressed and a method for producing the wavelength conversion element. Another advantage of some aspects of the invention is to provide a light source device including the wavelength conversion element. Still another advantage of some aspects of the invention is to provide a projector including the light source device.

According to a first aspect of the invention, a wavelength conversion element is provided. The wavelength conversion element includes a wavelength conversion layer which has a first face on which an excitation light is incident and a second face facing the first face, a first layer which is provided facing the second face and contains a first inorganic oxide, a second layer which is provided facing the first layer and contains a first metal or a second inorganic oxide that is different from the first inorganic oxide, and a third layer which is provided facing the second layer, contains either silver or aluminum, and reflects the excitation light or a light obtained by wavelength conversion of the excitation light by the wavelength conversion layer.

In the wavelength conversion element according to the first aspect of the invention, the second layer is provided on the face on the excitation light incident side of the third layer, and therefore, the deterioration of the third layer is reduced by the second layer. Due to this, a decrease in reflectance accompanying the deterioration of the third layer hardly occurs, and thus, a component incident on the third layer of the wavelength-converted light is favorably reflected and can be emitted from the wavelength conversion layer. Therefore, a decrease in the extraction efficiency of the wavelength-converted light can be suppressed.

In the first aspect of the invention, it is preferred that the wavelength conversion element further includes a fourth layer which is provided facing the third layer and contains the first metal or a second metal that is different from the first metal and a fifth layer which is provided facing the fourth layer and contains the first inorganic oxide or the second inorganic oxide.

According to this configuration, the protection performance for the third layer can be further improved.

In the first aspect of the invention, it is preferred that the wavelength conversion element further includes a substrate, and the fifth layer and the substrate are bonded to each other by a bonding material provided between the fifth layer and the substrate.

According to this configuration, heat generated in the wavelength conversion layer is transmitted to the substrate side through the third layer. Therefore, the heat dissipation of the wavelength conversion layer is increased, and thus, a decrease in the luminous efficiency of the wavelength conversion layer can be reduced.

In the first aspect of the invention, it is preferred that the first metal of the second layer is at least one type of metal selected from Al, Ni, Ti, W, and Nb.

According to this configuration, a configuration in which the deterioration of the third layer is suppressed can be realized.

In the first aspect of the invention, it is preferred that the second inorganic oxide of the second layer is an electrically conductive oxide material or an amorphous electrically conductive oxide.

According to this configuration, the second layer has a light transmission property, and therefore, a configuration in which the deterioration of the third layer is suppressed while efficiently making the excitation light incident on the third layer can be realized.

In the first aspect of the invention, it is preferred that the wavelength conversion element further includes a sixth layer which contains the first metal or the second inorganic oxide between the third layer and the fourth layer.

According to this configuration, by including the sixth layer, the deterioration of the third layer can be further reduced.

In the first aspect of the invention, it is preferred that the first metal of the sixth layer is at least one type of metal selected from Al, Ni, Ti, W, and Nb.

According to this configuration, a configuration in which the deterioration of the third layer is further reduced by the first metal can be realized.

In the first aspect of the invention, it is preferred that the second inorganic oxide of the sixth layer is an electrically conductive oxide material or an amorphous electrically conductive oxide.

According to this configuration, a configuration in which the deterioration of the third layer is further reduced by the second inorganic oxide can be realized.

According to a second aspect of the invention, a light source device is provided. The light source device includes the wavelength conversion element according to the first aspect of the invention, and a light source which emits the excitation light.

According to the light source device according to the second aspect of the invention, a light source device in which a decrease in the extraction efficiency of fluorescence YL is suppressed can be provided.

According to a third aspect of the invention, a projector is provided. The projector includes the light source device according to the second aspect of the invention, a light modulator which modulates a light from the light source device in accordance with image information to form an image light, and a projection optical system which projects the image light.

The projector according to the third aspect of the invention includes the light source device according to the second aspect of the invention, and therefore can form a high-luminance image.

According to a fourth aspect of the invention, a method for producing a wavelength conversion element is provided. The method includes a first step of forming a wavelength conversion layer which has a first face and a second face facing each other, a second step of forming a first layer which contains a first inorganic oxide at a position facing the second face of the wavelength conversion layer, a third step of forming a second layer which contains a first metal or a second inorganic oxide that is different from the first inorganic oxide at a position facing the first layer, and a fourth step of forming a third layer which contains either silver or aluminum and reflects the excitation light or a light obtained by wavelength conversion of the excitation light by the wavelength conversion layer at a position facing the second layer.

According to the method for producing a wavelength conversion element according to the fourth aspect of the invention, a wavelength conversion element in which a decrease in the extraction efficiency of a wavelength-converted light is suppressed can be produced.

In the fourth aspect of the invention, it is preferred that the first layer includes a first inorganic oxide layer and a second inorganic oxide layer, and the second step includes a first forming step of forming the first inorganic oxide layer on the second face using a chemical vapor deposition method, and a second forming step of forming the second inorganic oxide layer on the first inorganic oxide layer using a physical vapor deposition method.

According to this configuration, the first inorganic oxide layer is formed using a chemical vapor deposition method, and therefore, for example, even if a recessed portion is formed on the second face, the first inorganic oxide layer can be formed in the recessed portion. Due to this, the effect of the ruggedness of the recessed portion becomes small, and therefore, the surface of the first inorganic oxide layer formed on the second face can be made a flat face. Further, the second inorganic oxide layer is formed using a physical vapor deposition method which can be applied to the formation of various films such as a metal film and an oxide film, and therefore, the formation of other films constituting the first layer can be efficiently performed continuously following the formation of the second inorganic oxide layer.

Further, it is more preferred that $SiO_2$ is used as a material of the first inorganic oxide layer and the second inorganic oxide layer.

According to this configuration, the first inorganic oxide layer and the second inorganic oxide layer are made of the same material, and therefore, the adhesion force between the first inorganic oxide layer and the second inorganic oxide layer can be further increased.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
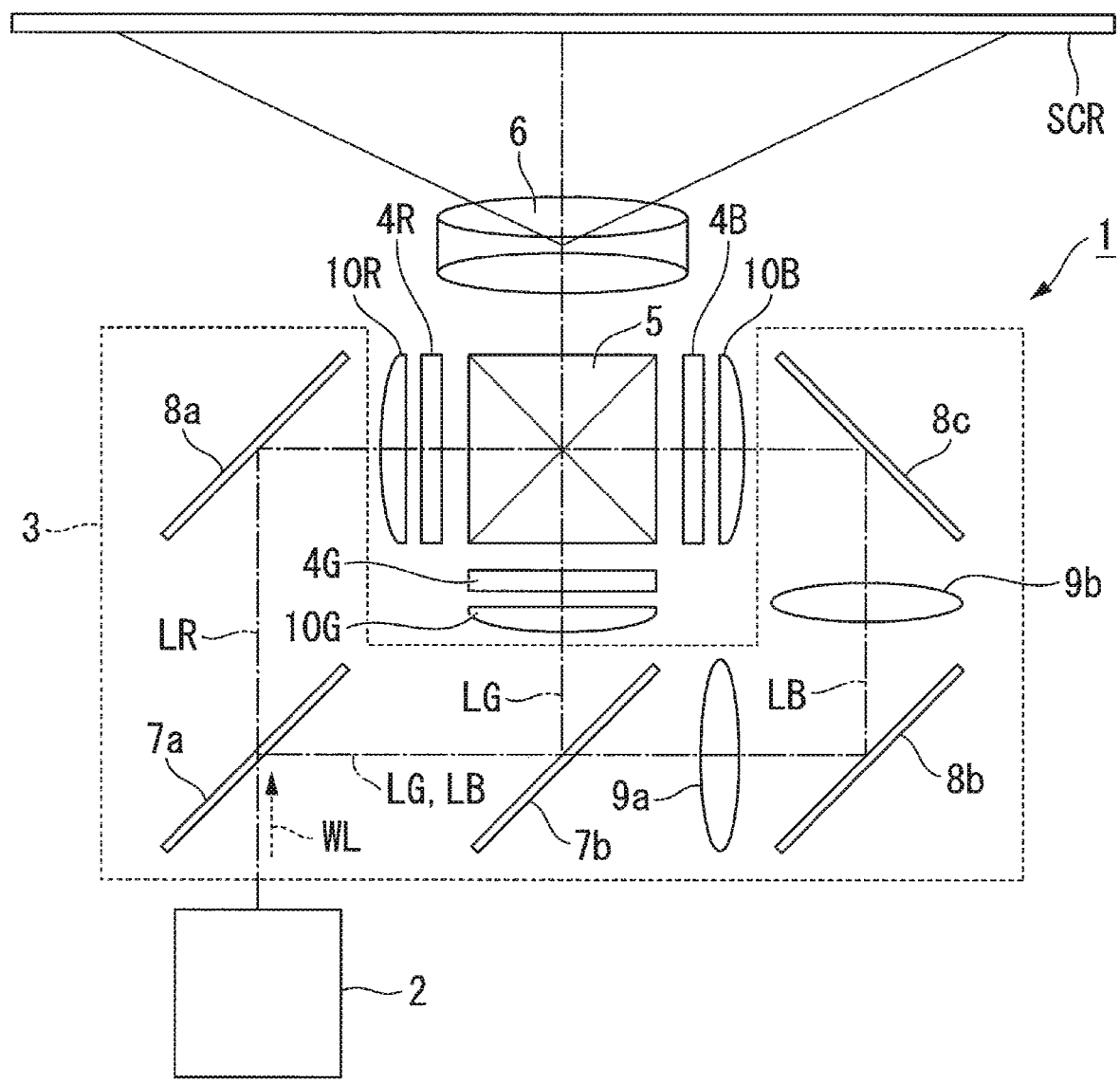
FIG. 1 is a view showing a schematic configuration of a projector according to a first embodiment.

Hereinafter, embodiments of the invention will be described in detail with reference to the drawings.

In the drawings to be used in the following description, in order to facilitate the understanding of features, characteristic portions are sometimes illustrated at an enlarged scale for convenience, and the dimensional ratios and the like of the respective components are not necessarily the same as the actual ones.

First Embodiment

First, one example of a projector according to this embodiment will be described.

FIG. 1 is a view showing a schematic configuration of the projector according to this embodiment.

As shown in FIG. 1, a projector 1 of this embodiment is a projection-type image display device which displays a color video image on a screen SCR. The projector 1 includes a lighting device 2, a color separation optical system 3, a light modulator 4R, a light modulator 4G, a light modulator 4B, a combining optical system 5, and a projection optical system 6.

The color separation optical system 3 separates an illumination light WL into a red light LR, a green light LG, and a blue light LB. The color separation optical system 3 generally includes a first dichroic mirror 7a, a second dichroic mirror 7b, a first total reflection mirror 8a, a second total reflection mirror 8b, a third total reflection mirror 8c, a first relay lens 9a, and a second relay lens 9b.

The first dichroic mirror 7a separates the illumination light WL from the lighting device 2 into the red light LR and the other lights (the green light LG and the blue light LB). The first dichroic mirror 7a transmits the separated red light LR and reflects the other lights (the green light LG and the blue light LB). On the other hand, the second dichroic mirror 7b reflects the green light LG and also transmits the blue light LB, thereby separating the other lights into the green light LG and the blue light LB.

The first total reflection mirror 8a is disposed in the optical path of the red light LR and reflects the red light LR transmitted through the first dichroic mirror 7a toward the light modulator 4R. On the other hand, the second total reflection mirror 8b and the third total reflection mirror 8c are disposed in the optical path of the blue light LB and guide the blue light LB transmitted through the second dichroic mirror 7b to the light modulator 4B. The green light LG is reflected from the second dichroic mirror 7b toward the light modulator 4G.

The first relay lens 9a and the second relay lens 9b are disposed downstream of the second dichroic mirror 7b in the optical path of the blue light LB.

The light modulator 4R modulates the red light LR in accordance with image information to form an image light corresponding to the red light LR. The light modulator 4G modulates the green light LG in accordance with image information to form an image light corresponding to the green light LG. The light modulator 4B modulates the blue light LB in accordance with image information to form an image light corresponding to the blue light LB.

In each of the light modulator 4R, the light modulator 4G, and the light modulator 4B, for example, a transmission-type liquid crystal panel is used. Further, a polarizing plate (not shown) is disposed on each of the light incident side and the light emission side of the liquid crystal panel.

Further, a field lens 10R, a field lens 10G, and a field lens 10B are disposed on the light incident side of the light modulator 4R, the light modulator 4G, and the light modulator 4B, respectively. The field lens 10R, the field lens 10G, and the field lens 10B collimate the red light LR, the green light LG, and the blue light LB to be incident on the light modulator 4R, the light modulator 4G, and the light modulator 4B, respectively.

An image light from each of the light modulator 4R, the light modulator 4G, and the light modulator 4B is incident on the combining optical system 5. The combining optical system 5 combines the image lights corresponding to the red light LR, the green light LG, and the blue light LB, respectively, and emits the combined image light toward the projection optical system 6. In the combining optical system 5, for example, a cross dichroic prism is used.

The projection optical system 6 is composed of a group of projection lenses and enlarges the image light combined by the combining optical system 5 and projects the enlarged image light toward the screen SCR. In this manner, an enlarged color video image is displayed on the screen SCR.

Lighting Device

Figure 2:
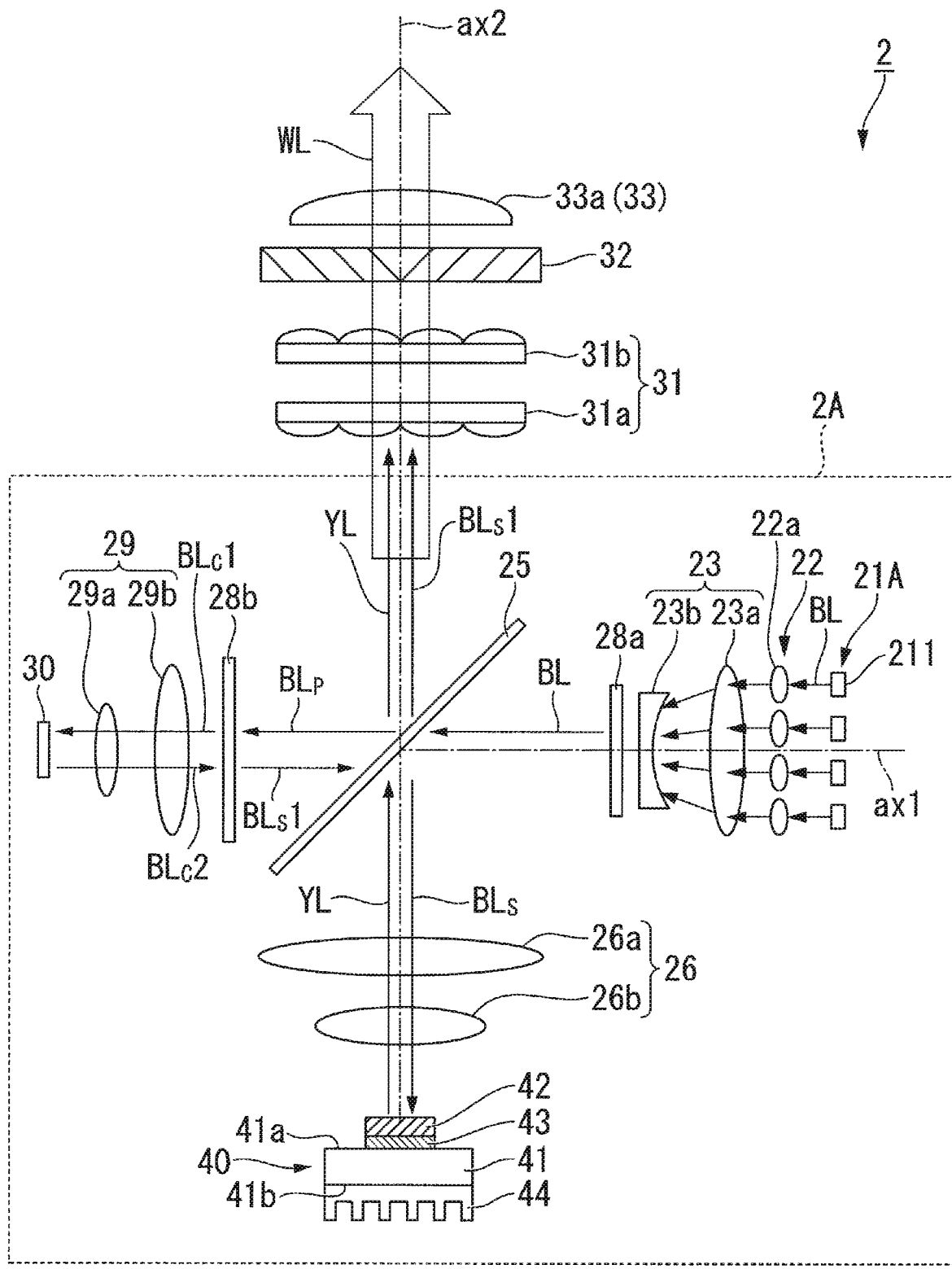
FIG. 2 is a view showing a schematic configuration of a lighting device.

Next, the lighting device 2 according to one embodiment of the invention will be described. FIG. 2 is a view showing a schematic configuration of the lighting device 2. As shown in FIG. 2, the lighting device 2 includes a light source device 2A, an integrator optical system 31, a polarization conversion element 32, and a superimposing lens 33a. In this embodiment, the integrator optical system 31 and the superimposing lens 33a constitute a superimposing optical system 33.

The light source device 2A includes an array light source 21A, a collimator optical system 22, an afocal optical system 23, a first retardation plate 28a, a polarization separation element 25, a first light condensing optical system 26, a wavelength conversion element 40, a second retardation plate 28b, a second light condensing optical system 29, and a diffuse reflection element 30.

The array light source 21A, the collimator optical system 22, the afocal optical system 23, the first retardation plate 28a, the polarization separation element 25, the second retardation plate 28b, the second light condensing optical system 29, and the diffuse reflection element 30 are sequentially arranged side by side on an optical axis ax1. On the other hand, the wavelength conversion element 40, the first light condensing optical system 26, the polarization separation element 25, the integrator optical system 31, the polarization conversion element 32, and the superimposing lens 33a are sequentially arranged side by side on an illumination light axis ax2. The optical axis ax1 and the illumination light axis ax2 are present on the same plane and orthogonal to each other.

The array light source 21A includes a plurality of semiconductor lasers 211 as a solid light source. The plurality of semiconductor lasers 211 are arranged in an array on a plane orthogonal to the optical axis ax1. Each of the semiconductor lasers 211 emits, for example, a blue light beam BL (for example, a laser beam having a peak wavelength of 460 nm). The array light source 21A emits a light beam bundle composed of a plurality of light beams BL. In this embodiment, the array light source 21A corresponds to the "light source" described in the appended claims.

The light beam BL emitted from the array light source 21A is incident on the collimator optical system 22. The collimator optical system 22 converts the light beam BL emitted from the array light source 21A into a parallel light. The collimator optical system 22 is constituted by, for example, a plurality of collimator lenses 22a arranged side by side in an array. The plurality of collimator lenses 22a are disposed corresponding to the plurality of semiconductor lasers 211.

The light beam BL having passed through the collimator optical system 22 is incident on the afocal optical system 23. The afocal optical system 23 adjusts the luminous flux diameter of the light beam BL. The afocal optical system 23 is constituted by, for example, a convex lens 23a and a concave lens 23b.

The light beam BL having passed through the afocal optical system 23 is incident on the first retardation plate 28a. The first retardation plate 28a is, for example, a rotatable ½-wave plate. The light beam BL emitted from the semiconductor laser 211 is a linearly polarized light. By appropriately setting the rotation angle of the first retardation plate 28a, the light beam BL to be transmitted through the first retardation plate 28a can be converted into a light beam containing an S-polarized component and a P-polarized component with respect to the polarization separation element 25 at a predetermined ratio. By rotating the first retardation plate 28a, the ratio of the S-polarized component to the P-polarized component can be changed.

The light beam BL containing the S-polarized component and the P-polarized component generated by passing through the first retardation plate 28a is incident on the polarization separation element 25. The polarization separation element 25 is constituted by, for example, a polarization beam splitter having wavelength selectivity. The polarization separation element 25 forms an angle of 45° with respect to the optical axis ax1 and also the illumination light axis ax2.

The polarization separation element 25 has a polarization separation function of separating the light beam BL into a light beam BLs which is the S-polarized component and a light beam BLp which is the P-polarized component with respect to the polarization separation element 25. Specifically, the polarization separation element 25 reflects the light beam BLs which is the S-polarized component and transmits the light beam BLp which is the P-polarized component.

The polarization separation element 25 also has a color separation function of transmitting fluorescence YL having a wavelength band different from that of the light beam BL irrespective of the polarization state of the fluorescence YL.

The S-polarized light beam BLs emitted from the polarization separation element 25 is incident on the first light condensing optical system 26. The first light condensing optical system 26 condenses the light beam BLs toward the wavelength conversion element 40.

In this embodiment, the first light condensing optical system 26 is constituted by, for example, a first lens 26a and a second lens 26b. The light beam BLs emitted from the first light condensing optical system 26 is incident on the wavelength conversion element 40 in a condensed state.

The fluorescence YL generated by the wavelength conversion element 40 is collimated by the first light condensing optical system 26 and then incident on the polarization separation element 25. The fluorescence YL is transmitted through the polarization separation element 25.

On the other hand, the P-polarized light beam BLp emitted from the polarization separation element 25 is incident on the second retardation plate 28b. The second retardation plate 28b is constituted by a ¼-wave plate disposed in the optical path between the polarization separation element 25 and the diffuse reflection element 30. Therefore, the P-polarized light beam BLp emitted from the polarization separation element 25 is converted into, for example, a right-hand circularly polarized blue light BLc1 by the second retardation plate 28b, and thereafter incident on the second light condensing optical system 29.

The second light condensing optical system 29 is constituted by, for example, convex lenses 29a and 29b, and makes the blue light BLc1 incident on the diffuse reflection element 30 in a condensed state.

The diffuse reflection element 30 is disposed on the opposite side to the phosphor layer 42 with respect to the polarization separation element 25, and diffusely reflects the blue light BLc1 emitted from the second light condensing optical system 29 toward the polarization separation element 25. As the diffuse reflection element 30, it is preferred to use an element which causes Lambertian reflection of the blue light BLc1 and does not disturb the polarization state.

Hereinafter, the light diffusely reflected by the diffuse reflection element 30 is referred to as "blue light BLc2". According to this embodiment, by diffusely reflecting the blue light BLc1, the blue light BLc2 having a substantially uniform illuminance distribution is obtained. For example, the right-hand circularly polarized blue light BLc1 is reflected as the left-hand circularly polarized blue light BLc2.

The blue light BLc2 is converted into a parallel light by the second light condensing optical system 29 and thereafter incident on the second retardation plate 28b again.

The left-hand circularly polarized blue light BLc2 is converted into an S-polarized blue light BLs1 by the second retardation plate 28b. The S-polarized blue light BLs1 is reflected toward the integrator optical system 31 by the polarization separation element 25.

Accordingly, the blue light BLs1 is used as the illumination light WL along with the fluorescence YL transmitted through the polarization separation element 25. That is, the blue light BLs1 and the fluorescence YL are emitted in the same direction from the polarization separation element 25, and a white illumination light WL, in which the blue light BLs1 and the fluorescence (yellow light) YL are mixed, is generated.

The illumination light WL is emitted toward the integrator optical system 31. The integrator optical system 31 is constituted by, for example, a lens array 31a and a lens array 31b. Each of the lens arrays 31a and 31b is composed of a plurality of small lenses arranged in an array.

The illumination light WL transmitted through the integrator optical system 31 is incident on the polarization conversion element 32. The polarization conversion element 32 is constituted by a polarization separation film and a retardation plate. The polarization conversion element 32 converts the illumination light WL which includes non-polarized fluorescence YL into a linearly polarized light.

The illumination light WL transmitted through the polarization conversion element 32 is incident on the superimposing lens 33a. The superimposing lens 33a homogenizes the distribution of illuminance by the illumination light WL in an illuminated region in cooperation with the integrator optical system 31. In this manner, the lighting device 2 generates the illumination light WL.

Wavelength Conversion Element

As shown in FIG. 2, the wavelength conversion element 40 includes a substrate 41 and the phosphor layer 42 and has a fixed-type configuration so as not to rotate. The substrate 41 has a first face 41a on the first light condensing optical system 26 side and a second face 41b on the opposite side to the first face 41a. The wavelength conversion element 40 further includes a reflection member 43 provided between the first face 41a and the phosphor layer 42 and a heat radiation member 44 provided on the second face 41b. In this embodiment, the phosphor layer 42 corresponds to the "wavelength conversion layer" described in the appended claims.

As the material of the substrate 41, it is preferred to use a material having high thermal conductivity and excellent heat dissipation, and examples thereof include metals such as aluminum and copper, and ceramics such as aluminum nitride, alumina, sapphire, and diamond. In this embodiment, the substrate 41 was formed using copper.

In this embodiment, the phosphor layer 42 is held through the below-mentioned bonding material on the first face 41a of the substrate 41. The phosphor layer 42 partially converts an incident light into fluorescence YL and emits the fluorescence YL. Further, the reflection member 43 reflects a light incident from the phosphor layer 42 toward the first light condensing optical system 26.

The heat radiation member 44 is constituted by, for example, a heat sink and is configured to include a plurality of fins. The heat radiation member 44 is provided on the second face 41b on the opposite side to the phosphor layer 42 of the substrate 41. The heat radiation member 44 is fixed to the substrate 41 by bonding (metal bonding) with, for example, a brazing metal. In the wavelength conversion element 40, heat can be radiated through this heat radiation member 44, and therefore, thermal deterioration of the phosphor layer 42 can be prevented.

Figure 3:
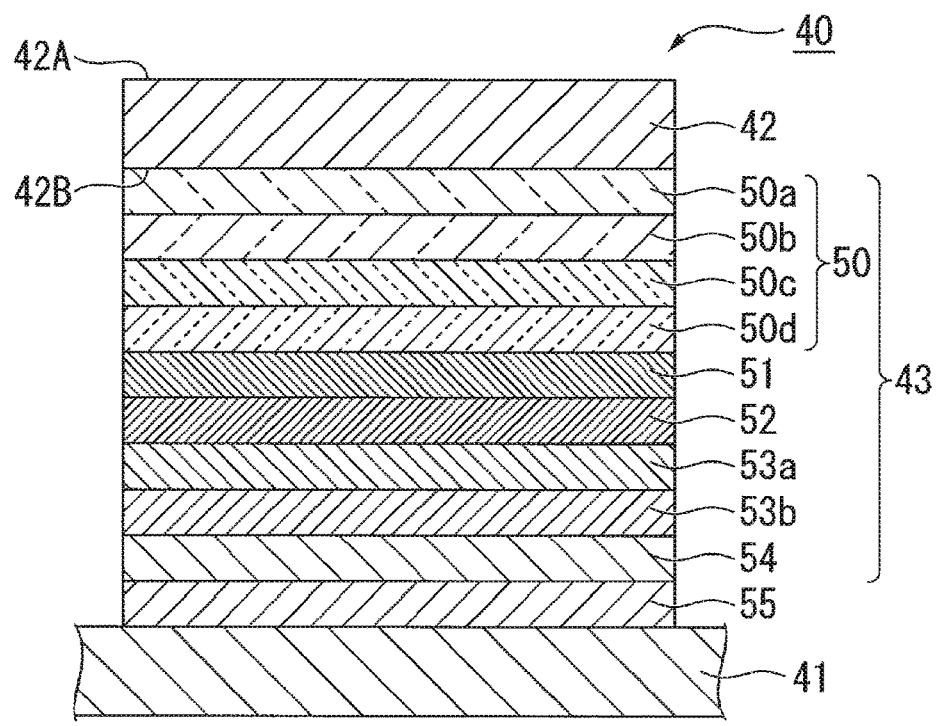
FIG. 3 is a cross-sectional view showing a configuration of a main portion of a wavelength conversion element.

In this embodiment, the reflection member 43 is constituted by a multilayer film in which a plurality of films are stacked. FIG. 3 is a cross-sectional view showing a configuration of a main portion of the wavelength conversion element 40. Specifically, FIG. 3 is a view showing the cross section of the reflection member 43. In FIG. 3, illustration of the heat radiation member 44 is omitted. Hereinafter, the light beam BLs which is emitted from the first light condensing optical system 26 and is incident on the phosphor layer 42 is referred to as "excitation light BLs".

As shown in FIG. 3, the phosphor layer 42 includes a light incident face 42A on which the excitation light BLs is incident and also from which the fluorescence YL is emitted, and a face which faces the light incident face 42A, that is, a bottom face 42B on which the reflection member 43 is provided. In this embodiment, the phosphor layer 42 corresponds to the "wavelength conversion layer" described in the appended claims, the light incident face 42A corresponds to the "first face" described in the appended claims, and the bottom face 42B corresponds to the "second face" described in the appended claims.

In this embodiment, the phosphor layer 42 is a ceramic phosphor formed by firing phosphor particles. As the phosphor particles constituting the phosphor layer 42, a YAG (Yttrium Aluminum Garnet) phosphor containing Ce ions is used.

As the forming material of the phosphor particles, one type of material may be used, or a material obtained by mixing particles formed using two or more types of materials may be used. As the phosphor layer 42, a phosphor layer in which the phosphor particles are dispersed in an inorganic binder such as alumina, a phosphor layer formed by firing a glass binder which is an inorganic material and the phosphor particles, or the like is preferably used. The phosphor layer may be formed by firing the phosphor particles without using a binder.

The reflection member 43 is provided on the bottom face 42B side of the phosphor layer 42. The phosphor layer 42 on which the reflection member 43 is formed is bonded to the substrate 41 through a bonding material 55. As the bonding material 55, for example, a nano-silver paste is used. Further, as the bonding material 55, for example, metal bonding with a brazing metal may be used.

The reflection member 43 of this embodiment is constituted by stacking a multilayer film 50, a deterioration prevention film 51, a reflection layer 52, a first protective layer 53a, a second protective layer 53b, and a bonding assisting layer 54 in this order from the bottom face 42B side of the phosphor layer 42.

The multilayer film 50 is a layer containing an inorganic oxide (first inorganic oxide) and includes a total reflection layer 50a which totally reflects alight at an angle not smaller than the critical angle of the fluorescence YL generated by the phosphor layer 42, and reflection enhancing layers 50b, 50c, and 50d. The reflection enhancing layers 50b, 50c, and 50d are provided for exhibiting a reflection enhancing effect and improve the extraction efficiency of the fluorescence YL. The multilayer film 50 corresponds to the "first layer" described in the appended claims. The multilayer film 50 (total reflection layer 50a) is provided abutting or being stacked on the bottom face 42B of the phosphor layer 42.

In this embodiment, as the total reflection layer 50a, for example, SiO$_2$ was used. By using SiO$_2$, the fluorescence YL can be favorably totally reflected.

Further, as the reflection enhancing layer 50b, TiO$_2$ was used, as the reflection enhancing layer 50c, SiO$_2$ was used, and as the reflection enhancing layer 50d, Al$_2$O$_3$ was used.

In this embodiment, the deterioration prevention film 51 is composed of a layer containing a metal. The deterioration prevention film 51 is provided for suppressing the deterioration of the reflection layer 52 as described below. The deterioration prevention film 51 corresponds to the "second layer" described in the appended claims.

In this embodiment, the deterioration prevention film 51 contains, for example, at least one type of metal (first metal) selected from Al, Ni, Ti, W, and Nb. In this embodiment, as the material of the deterioration prevention film 51, Ti was used. The film thickness thereof is set to, for example, about 0.1 nm to 5 nm. It is because when the film thickness is smaller than 0.1 nm, the deterioration prevention effect on the reflection layer 52 is decreased, and when the film thickness is larger than 5 nm, the transmissivity is decreased.

The reflection layer 52 partially reflects the fluorescence YL, which is generated by the phosphor layer 42 and is directed to the bottom face 42B side, toward the light incident face 42A side. Further, the reflection layer 52 reflects the excitation light BLs which is incident on the phosphor layer 42 and is then incident on the reflection member 43 without being converted into the fluorescence YL and returns the excitation light BLs inside the phosphor layer 42. By doing this, the fluorescence YL can be efficiently generated. The reflection layer 52 corresponds to the "third layer" described in the appended claims.

As the material of the reflection layer 52, Ag or Al was used. In this embodiment, Ag capable of obtaining a higher reflectance was used as the material of the reflection layer 52. In the case where Ag is used for the reflection layer 52, the deterioration prevention film 51 contains, for example, at least one type of metal selected from Al, Ni, Ti, W, and Nb. In the case where Al is used for the reflection layer 52, the deterioration prevention film 51 contains, for example, at least one type of metal selected from Ni, Ti, W, and Nb.

In this embodiment, the cohesive energy of the element (Ti) constituting the deterioration prevention film 51 is larger than the cohesive energy of the element (Ag) constituting the reflection layer 52. Here, the phrase "the cohesive energy is large" means that a larger energy is needed for causing aggregation.

In the reflection layer 52 in which Ti having a large cohesive energy is formed on the light incident side, by the action of Ti, migration of Ag atoms due to heat hardly occurs, and therefore, the occurrence of aggregation due to migration is reduced. That is, in the reflection layer 52, a decrease in reflectance accompanying the occurrence of aggregation and a decrease in durability are suppressed. According to the reflection member 43 of this embodiment, the deterioration prevention film 51 is included, and therefore, the deterioration of the reflection layer 52 can be reduced.

The first protective layer 53a and the second protective layer 53b have a function of protecting the reflection layer 52. The first protective layer 53a is composed of a film containing a metal. The first protective layer 53a is composed of, for example, a Ni film, and promotes the crystallization of the reflection layer 52 (Ag film) and can improve the durability.

The first protective layer 53a may be formed of a film containing the same metal as that of the deterioration prevention film 51. That is, in the case where Ti is used as the material of the deterioration prevention film 51, Ti may be used as the material of the first protective layer 53a.

The second protective layer 53b is composed of a layer containing an inorganic oxide. The second protective layer 53b is composed of, for example, Al$_2$O$_3$, and can suppress the oxidation of the reflection layer 52 (Ag film) and improve adhesion to the below-mentioned bonding assisting layer 54.

In the case where $SiO_2$, $TiO_2$, and $Al_2O_3$ are used as the materials of the multilayer film 50, the second protective layer 53b may be formed using a material different from these materials.

In this embodiment, the first protective layer 53a corresponds to the "fourth layer" described in the appended claims, and the second protective layer 53b corresponds to the "fifth layer" described in the appended claims.

The bonding assisting layer 54 improves the reliability for bonding of the reflection member 43 to the substrate 41 by the bonding material 55. By using, for example, an Ag layer as the bonding assisting layer 54, the thermal conductivity between the reflection member 43 and the substrate 41 can be improved.

Figure 4:
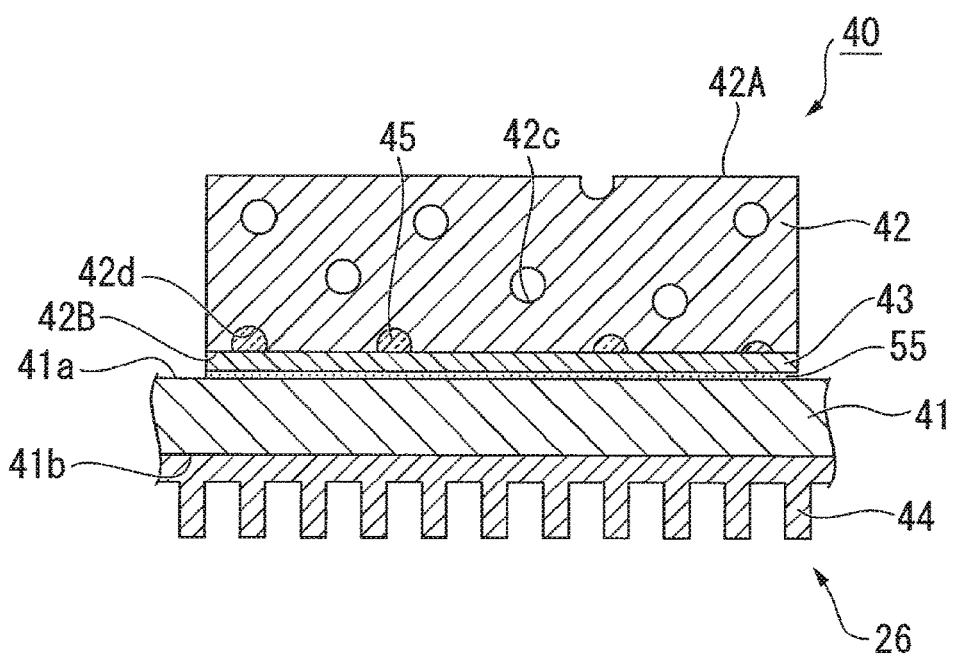
FIG. 4 is a cross-sectional view showing a configuration of a main portion of a phosphor layer.

FIG. 4 is a cross-sectional view showing a configuration of a main portion of the phosphor layer 42.

As shown in FIG. 4, in this embodiment, the phosphor layer 42 has a plurality of pores 42c which are provided inside. According to this, the phosphor layer 42 has a light scattering property due to the plurality of pores 42c.

Some of the plurality of pores 42c are formed on the surface (bottom face 42B) of the phosphor layer 42, and therefore, a recessed portion 42d due to the pore 42c occurs on the bottom face 42B of the phosphor layer 42. The wavelength conversion element 40 of this embodiment has a transparent member 45 which seals the recessed portion 42d.

As the material of the transparent member 45, an inorganic material having a light transmission property, for example, alumina, $Y_3Al_5O_{12}$, $YAlO_3$, zirconia dioxide, $Lu_3Al_5O_{12}$, $SiO_2$ (a glass paste), or an anaerobic adhesive is used. In this embodiment, as the material of the transparent member 45, it is desired to use the same material as that of the reflection member 43 formed on the bottom face 42B of the phosphor layer 42.

Specifically, as the material of the transparent member 45, for example, $SiO_2$ which is the same material as that of the total reflection layer 50a can be used. According to this, the transparent member 45 and the total reflection layer 50a (the first layer of the reflection member 43) can be formed by the same process.

As described above, the reflection member 43 is constituted by forming a plurality of layers on the bottom face 42B of the phosphor layer 42. Here, if the flatness of the bottom face 42B is low, it becomes difficult to favorably form the respective layers constituting the reflection member 43. If the reflection member 43 cannot be favorably formed on the bottom face 42B, the fluorescence YL cannot be reflected toward the light incident face 42A, and the extraction efficiency of the fluorescence YL is decreased.

On the other hand, in the wavelength conversion element 40 of this embodiment, by sealing the recessed portion 42d with the transparent member 45, the bottom face 42B is made a substantially flat face. Here, the "substantially flat face" means a flatness such that the reflection member 43 can be favorably formed on the bottom face 42B by vapor deposition or the like and a ruggedness to such a degree that the reflection member 43 can be formed is acceptable.

In this embodiment, the transparent member 45 is constituted by the same material as that of the total reflection layer 50a. Therefore, the transparent member 45 and the total reflection layer 50a (reflection member 43) are integrally formed.

The wavelength conversion element 40 of this embodiment is produced by, for example, the following production method.

First, a mixture composed of phosphor particles constituting the phosphor layer 42 and an organic substance is prepared, and the resulting mixture is fired at a predetermined temperature.

By firing, the organic substance is evaporated, and as shown in FIG. 4, the phosphor layer 42 having a plurality of pores 42c and composed of a phosphor is formed. The size or number of pores 42c can be adjusted by the firing temperature, the material of the organic substance, or the like.

Subsequently, both faces of the phosphor layer 42 are ground and polished, whereby the phosphor layer 42 having the light incident face 42A and the bottom face 42B is formed. By grinding and polishing, some pores 42c are exposed outside, and the recessed portions 42d are formed on the bottom face 42B of the phosphor layer 42.

Subsequently, to the bottom face 42B, a glass paste ($SiO_2$) is applied by a spin coating method. By doing this, the glass paste is applied to the entire surface of the bottom face 42B in a state where the recessed portions 42d are filled up with the glass paste.

Then, by firing the glass paste, as shown in FIG. 4, the transparent member 45 which seals the recessed portions 42d, and the total reflection layer 50a formed integrally with the transparent member 45 are formed on the bottom face 42B. The method for applying the glass paste on the bottom face 42B is not limited to the spin coating method, and a doctor blade method may be used.

By sealing the recessed portions 42d with the transparent member 45 in this manner, the surface of the bottom face 42B (total reflection layer 50a) can be made a substantially flat face. The temperature when the glass paste is fired is lower than the temperature when the mixture composed of the phosphor particles and the organic substance is fired.

Subsequently, the respective layers are sequentially formed on the total reflection layer 50a by vapor deposition, sputtering, or the like, whereby the reflection member 43 is formed. The total reflection layer 50a has a substantially flat face as described above, and therefore, the reflection member 43 can be uniformly formed on the bottom face 42B.

Subsequently, the substrate 41 and the stacked body of the reflection member 43 and the phosphor layer 42 are fixed through the bonding material 55. Finally, the heat radiation member 44 is fixed to the face on the opposite side to the phosphor layer 42 of the substrate 41, whereby the wavelength conversion element 40 is produced.

In the above-mentioned production method, a mixture composed of phosphor particles constituting the phosphor layer 42 and an inorganic substance is prepared, and the mixture may be fired at a predetermined temperature, or only the phosphor particles constituting the phosphor layer 42 may be fired at a predetermined temperature.

As described above, in the wavelength conversion element 40 of this embodiment, the deterioration of the refection layer 52 composed of the Ag film due to aggregation is suppressed by the deterioration prevention film 51. Therefore, a decrease in reflectance accompanying the deterioration of the refection layer 52 hardly occurs, and thus, a component incident on the bottom face 42B side of the fluorescence YL generated by the phosphor layer 42 is favorably reflected and can be emitted from the light incident face 42A. Therefore, a decrease in the extraction efficiency of the fluorescence YL can be suppressed.

In this embodiment, by using a Ni film as the metal film constituting the first protective layer 53a which protects the reflection layer 52, the crystallization of the reflection layer 52 (Ag film) is promoted, and the durability can be improved.

In this embodiment, by using $Al_2O_3$ as the inorganic oxide constituting the second protective layer 53b which protects the reflection layer 52, the oxidation of the reflection layer 52 (Ag film) can be suppressed, and also the adhesion thereof to the bonding assisting layer 54 can be improved.

In this embodiment, by filling up the recessed portions 42d of the phosphor layer 42 with the transparent member 45, the reflection member 43 is uniformly formed over the entire area of the bottom face 42B. Therefore, a component incident on the bottom face 42B side of the fluorescence YL generated by the phosphor layer 42 is favorably reflected by the reflection member 43 and can be emitted from the light incident face 42A. Therefore, the extraction efficiency of the fluorescence YL can be increased.

Further, the bottom face 42B becomes a substantially flat face, and therefore, the contact area between the phosphor layer 42 and the reflection member 43 can be increased. Due to this, heat generated in the phosphor layer 42 is efficiently transmitted to the reflection member 43. Further, heat generated in the phosphor layer 42 is transmitted to the substrate 41 and the heat radiation member 44 side through the reflection member 43. Therefore, the heat dissipation of the phosphor layer 42 is increased.

By increasing the heat dissipation of the phosphor layer 42 in this manner, the heat radiation member 44 can be miniaturized, and therefore, the wavelength conversion element 40 can be miniaturized.

In the wavelength conversion element 40 of this embodiment, by increasing the heat dissipation of the phosphor layer 42, an increase in the temperature of the phosphor layer 42 is reduced, and a decrease in the luminous efficiency of the phosphor layer 42 can be reduced.

Therefore, the light source device 2A including this wavelength conversion element 40 can provide a light source device in which a decrease in the extraction efficiency of the fluorescence YL is suppressed.

Further, in the projector 1 of this embodiment, the lighting device 2 using the light source device 2A is included, and therefore, the projector 1 can form a high-luminance image.

Modification Example of First Embodiment

Next, a modification example of the method for producing the wavelength conversion element 40 of the first embodiment will be described. The members common to those of the above-mentioned embodiment are denoted by the same reference numerals, and a detailed description thereof will be omitted.

First, a phosphor layer 42 (wavelength conversion layer) is formed (first step).

Specifically, a mixture composed of phosphor particles constituting the phosphor layer 42 and an organic substance is prepared, and the resulting mixture is fired at a predetermined temperature.

By firing, the organic substance is evaporated, and as shown in FIG. 4, the phosphor layer 42 having a plurality of pores 42c and composed of a phosphor is formed. The size or number of pores 42c can be adjusted by the firing temperature, the material of the organic substance, or the like.

Subsequently, both faces of the phosphor layer 42 are ground and polished, whereby the phosphor layer 42 having the light incident face 42A and the bottom face 42B is formed. By grinding and polishing, some pores 42c are exposed outside, and the recessed portions 42d are formed on the bottom face 42B of the phosphor layer 42. In this manner, the step of forming the phosphor layer 42 is completed.

Subsequently, the multilayer film 50 (first layer) is formed (second step).

In this modification example, the second step includes a first forming step of forming a first inorganic oxide layer on the bottom face 42B of the phosphor layer 42 using a chemical vapor deposition method, and a second forming step of forming a second inorganic oxide layer on a first total reflection layer using a physical vapor deposition method.

Specifically, in the first forming step, by chemical vapor deposition (CVD), $SiO_2$ is deposited on the bottom face 42B of the phosphor layer 42. In a CVD device, the raw material density can be increased according to the pressure in the chamber, and therefore, by moderately increasing the pressure in the chamber, the deposition speed can be improved. Further, in deposition by CVD, the orientation of the raw material molecules is lost by collision in the gas phase.

Figure 5A:
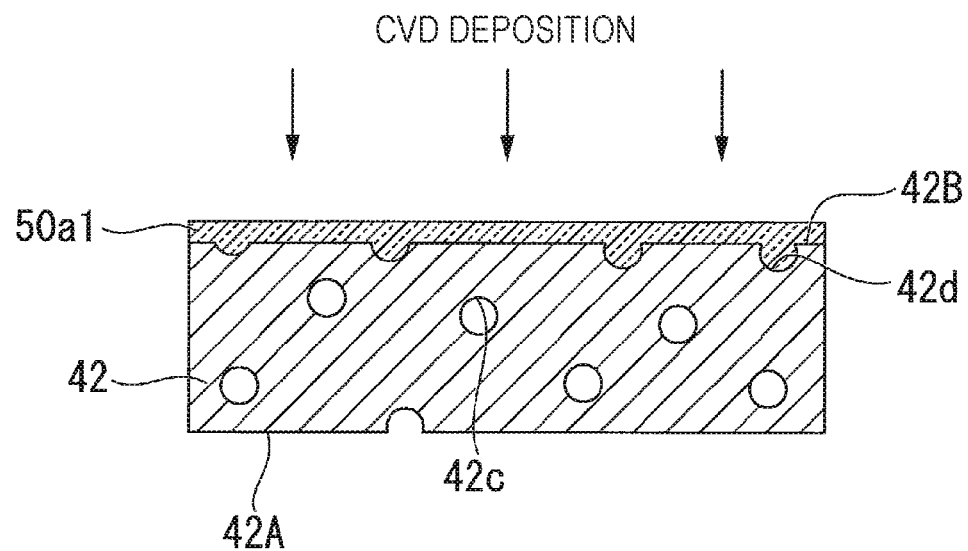
FIG. 5A is a view showing a step of producing a wavelength conversion element according to a modification example of the first embodiment.

By doing this, as shown in FIG. 5A, $SiO_2$ deposited by CVD forms a first total reflection layer 50a1 ($SiO_2$), which is formed so as to penetrate into the recessed portions 42d and also cover the bottom face 42B, on the bottom face 42B. By performing deposition through CVD in this manner, the first total reflection layer 50a1 is provided in the recessed portions 42d so that the effect of the ruggedness of the recessed portions 42d becomes small. Therefore, the surface of the first total reflection layer 50a1 formed on the bottom face 42B can be made a substantially smooth face (flat face).

In this modification example, the film thickness of the first total reflection layer 50a1 is preferably set to 600 nm or more. By setting the film thickness to 600 nm or more in this manner, the first total reflection layer 50a1 can efficiently emit the fluorescence YL from the light incident face 42A by total reflection. Further, by the penetration of the first total reflection layer 50a1 into the recessed portions 42d, the effect of the recessed portions 42d can be reduced.

Figure 5B:
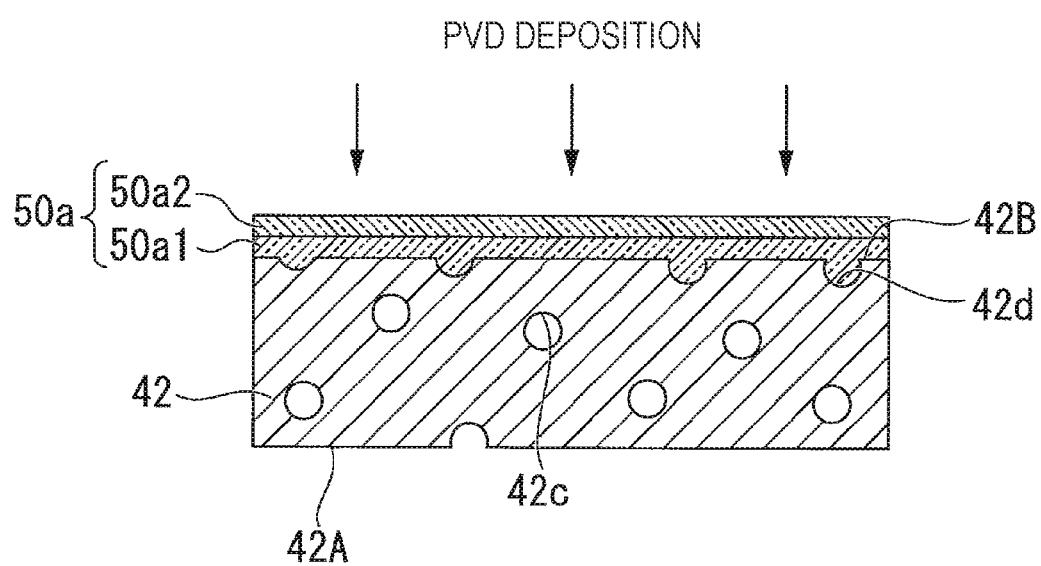
FIG. 5B is a view showing a step of producing the wavelength conversion element according to the modification example of the first embodiment.

Subsequently, in the second forming step, as shown in FIG. 5B, a second total reflection layer 50a2 ($SiO_2$) is formed on the first total reflection layer 50a1 by physical vapor deposition (PVD), whereby the total reflection layer 50a is formed.

The film thickness of the second total reflection layer 50a2 is appropriately adjusted according to the other layers (reflection enhancing layers 50b, 50c, and 50d) of the multilayer film 50 in contact with the second total reflection layer 50a2.

In this modification example, the total reflection layer 50a includes the first total reflection layer 50a1 and the second total reflection layer 50a2. The first total reflection layer 50a1 corresponds to the "first inorganic oxide layer" described in the appended claims, and the second total reflection layer 50a2 corresponds to the "second inorganic oxide layer" described in the appended claims.

In this modification example, the surface of the first total reflection layer 50a1 becomes a substantially flat face, and therefore, also the surface of the second total reflection layer 50a2 can be made a substantially flat face.

In this modification example, the first total reflection layer 50a1 and the second total reflection layer 50a2 are formed using a material containing the same main component. Specifically, as the materials of the first total reflection layer 50a1 and the second total reflection layer 50a2, $SiO_2$ was used. By forming the first total reflection layer 50a1 and the second total reflection layer 50a2 using the same material (SiO$_2$) in this manner, the adhesion force between the first total reflection layer 50a1 and the second total reflection layer 50a2 can be increased.

Then, the respective layers (the deterioration prevention film 51, the reflection layer 52, the first protective layer 53a, the second protective layer 53b, and the bonding assisting layer 54 shown in FIG. 3) are sequentially formed on the second total reflection layer 50a2 by PVD (for example, vapor deposition, sputtering, or the like), whereby the reflection member 43 is formed (the third step and the fourth step). The second total reflection layer 50a2 has a substantially flat face as described above, and therefore, the reflection member 43 can be uniformly formed on the bottom face 42B.

Subsequently, the substrate 41 and the stacked body of the reflection member 43 and the phosphor layer 42 are fixed through the bonding material 55. Finally, the heat radiation member 44 is fixed to the face on the opposite side to the phosphor layer 42 of the substrate 41, whereby the wavelength conversion element 40 is produced.

In the above-mentioned production method, a mixture composed of phosphor particles constituting the phosphor layer 42 and an inorganic substance is prepared, and the mixture may be fired at a predetermined temperature, or only the phosphor particles constituting the phosphor layer 42 may be fired at a predetermined temperature.

As described above, by the method for producing the wavelength conversion element 40 according to this modification example, by forming the first total reflection layer 50a1 using CVD, the transparent member 45 (SiO$_2$) can be formed in the recessed portions 42d.

In this modification example, by forming the total reflection layer 50a (the first total reflection layer 50a1 and the second total reflection layer 50a2) using the same material (SiO$_2$), the adhesion force between the first total reflection layer 50a1 and the second total reflection layer 50a2 can be increased. Therefore, the effect described in the first embodiment can be further enhanced.

Further, after forming the first total reflection layer 50a1, the second total reflection layer 50a2 (SiO$_2$) is formed by PVD, and therefore, the formation of the respective layers constituting the reflection member 43 can be efficiently performed continuously following the formation of the second total reflection layer 50a2. This is because various films such as a metal film including an Ag reflection film and an oxide film other than SiO$_2$ can be formed by PVD.

The material of the first total reflection layer 50a1 may not be SiO$_2$. As the material of the first total reflection layer 50a1, for example, SiN or SiON may be used. In this case, it is desired to use a material containing the same main component in the first total reflection layer 50a1 and the second total reflection layer 50a2. For example, in the case where SiN is used as the material of the first total reflection layer 50a1, as the material of the second total reflection layer 50a2, SiO$_2$ may be used.

Second Embodiment

Next, a wavelength conversion element according to a second embodiment of the invention will be described. The members common to those of the above-mentioned embodiment are denoted by the same reference numerals, and a detailed description thereof will be omitted.

Figure 6:
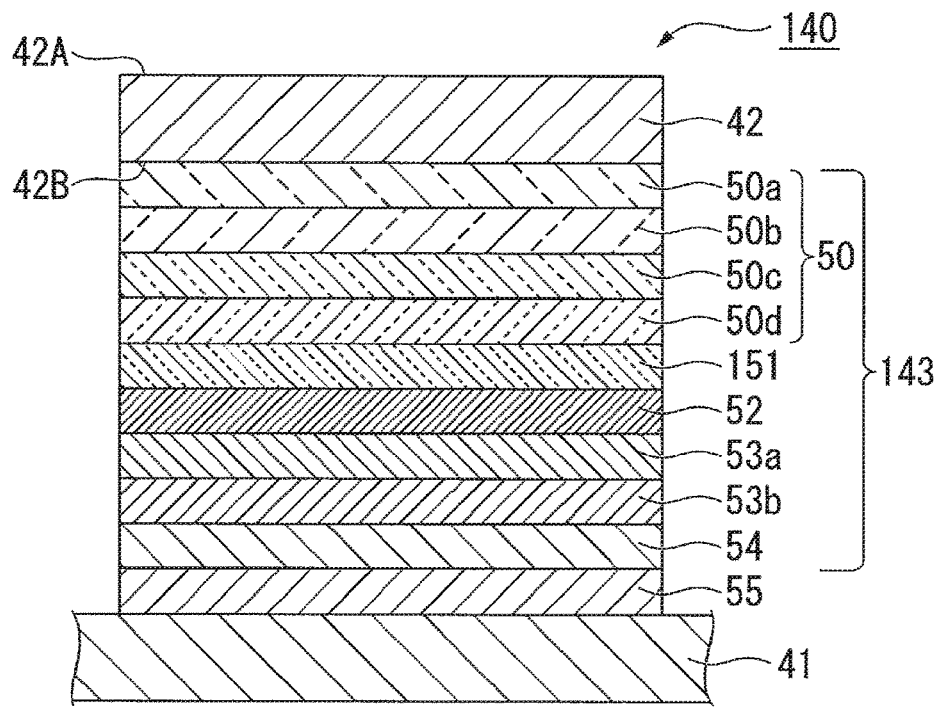
FIG. 6 is a cross-sectional view showing a configuration of a main portion of a wavelength conversion element according to a second embodiment.

FIG. 6 is a cross-sectional view showing a configuration of a main portion of a wavelength conversion element 140 according to this embodiment. Specifically, FIG. 6 is a view showing the cross section of a reflection member 143.

As shown in FIG. 6, the wavelength conversion element 140 includes the reflection member 143 which is provided between a first face 41a of a substrate 41 and a phosphor layer 42.

The reflection member 143 of this embodiment is constituted by stacking a multilayer film 50, a deterioration prevention film 151, a reflection layer 52, a first protective layer 53a, a second protective layer 53b, and a bonding assisting layer 54 in this order from the bottom face 42B side of the phosphor layer 42.

In this embodiment, the deterioration prevention film 151 is composed of a layer containing an electrically conductive oxide material or an amorphous electrically conductive oxide as an inorganic oxide (second inorganic oxide) having a light transmission property. The deterioration prevention film 151 is provided for suppressing the deterioration of the reflection layer 52 as described below. The deterioration prevention film 151 corresponds to the "second layer" described in the appended claims.

In this embodiment, the deterioration prevention film 151 contains at least one type of metal selected from, for example, ITO (indium tin oxide), FTO (fluorine-doped tin oxide, SnO$_2$:F), ATO (antimony-doped tin oxide, SnO$_2$:Sb), AZO (aluminum-doped zinc oxide, ZnO:Al), GZO (gallium-doped zinc oxide, ZnO:Ga), IZO (indium-doped zinc oxide), IGO (gallium-doped indium oxide), zinc oxide (ZnO), and tin oxide (SnO$_2$) as the electrically conductive oxide material or the amorphous electrically conductive oxide. In this embodiment, as the material of the deterioration prevention film 151, ITO was used. The film thickness of ITO is set to, for example, about 1 nm to 20 nm, more preferably about 3 nm to 15 nm. It is because when the film thickness is smaller than 1 nm, the deterioration prevention effect on the reflection layer 52 is decreased, and when the film thickness is larger than 20 nm, the transmissivity is decreased.

That is, according to this embodiment, the deterioration prevention film 151 having a large thickness within a range where the light transmission property of the deterioration prevention film 151 is ensured can be formed on the reflection layer 52. The reflection layer 52 is covered with the deterioration prevention film 151, and therefore, migration of Ag atoms due to heat hardly occurs.

Therefore, in the reflection layer 52, the occurrence of aggregation due to migration is reduced. That is, in the reflection layer 52, a decrease in reflectance accompanying the occurrence of aggregation and a decrease in durability are suppressed. In the reflection member 143 of this embodiment, the deterioration prevention film 151 is included, and therefore, the deterioration of the reflection layer 52 can be reduced.

In the wavelength conversion element 140 of this embodiment, a decrease in the reflectance of the reflection layer 52 accompanying deterioration hardly occurs, and thus, the fluorescence YL generated by the phosphor layer 42 can be favorably emitted from the light incident face 42A. Therefore, a decrease in the extraction efficiency of the fluorescence YL can be suppressed.

The deterioration prevention film 151 of this embodiment has a higher light transmission property than the deterioration prevention film 51 of the first embodiment, and therefore, the range of the thickness of the deterioration prevention film can be expanded. That is, the deterioration of the reflection layer 52 can be reduced while increasing the film thickness.

Third Embodiment

Next, a wavelength conversion element according to a third embodiment of the invention will be described. The members common to those of the first embodiment are denoted by the same reference numerals, and a detailed description thereof will be omitted.

Figure 7:
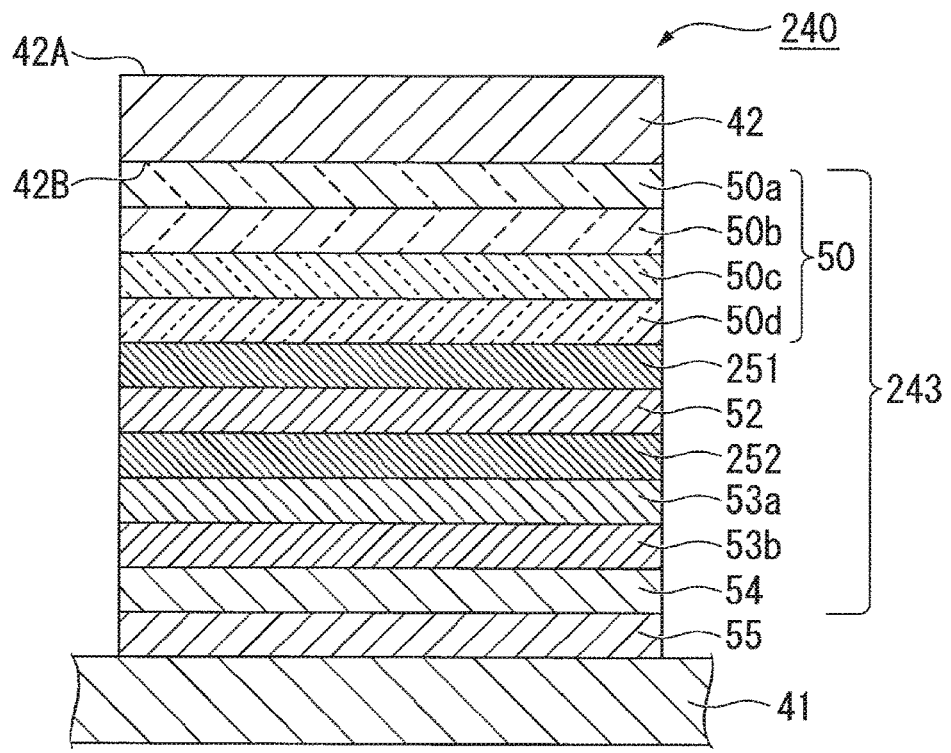
FIG. 7 is a cross-sectional view showing a configuration of a main portion of a wavelength conversion element according to a third embodiment.

FIG. 7 is a cross-sectional view showing a configuration of a main portion of a wavelength conversion element 240 according to this embodiment. Specifically, FIG. 7 is a view showing the cross section of a reflection member 243.

As shown in FIG. 7, the wavelength conversion element 240 includes the reflection member 243 which is provided between a first face 41a of a substrate 41 and a phosphor layer 42.

The reflection member 243 of this embodiment is constituted by stacking a multilayer film 50, a first deterioration prevention film 251, a reflection layer 52, a second deterioration prevention film 252, a first protective layer 53a, a second protective layer 53b, and a bonding assisting layer 54 in this order from the bottom face 42B side of the phosphor layer 42.

In this embodiment, each of the first deterioration prevention film 251 and the second deterioration prevention film 252 is composed of a layer containing a metal. The first deterioration prevention film 251 corresponds to the "second layer" described in the appended claims, and the second deterioration prevention film 252 corresponds to the "sixth layer" described in the appended claims.

In this embodiment, the first deterioration prevention film 251 and the second deterioration prevention film 252 contain at least one type of metal selected from, for example, Al, Ni, Ti, W, and Nb. In this embodiment, as the materials of the first deterioration prevention film 251 and the second deterioration prevention film 252, Ti was used for both. The materials of the first deterioration prevention film 251 and the second deterioration prevention film 252 may be different from each other.

In this embodiment, the cohesive energy of the element (Ti) constituting each of the first deterioration prevention film 251 and the second deterioration prevention film 252 is larger than the cohesive energy of the element (Ag) constituting the reflection layer 52.

In this embodiment, the reflection layer 52 is provided with Ti having a large cohesive energy on the light incident side and the light emission side, and therefore, migration of Ag atoms is less likely to occur. Accordingly, as compared with the configuration of the first embodiment, the occurrence of aggregation due to migration is further reduced.

In the wavelength conversion element 240 of this embodiment, a decrease in the extraction efficiency of the fluorescence YL is more easily suppressed.

Fourth Embodiment

Next, a wavelength conversion element according to a fourth embodiment of the invention will be described. The members common to those of the second embodiment are denoted by the same reference numerals, and a detailed description thereof will be omitted.

Figure 8:
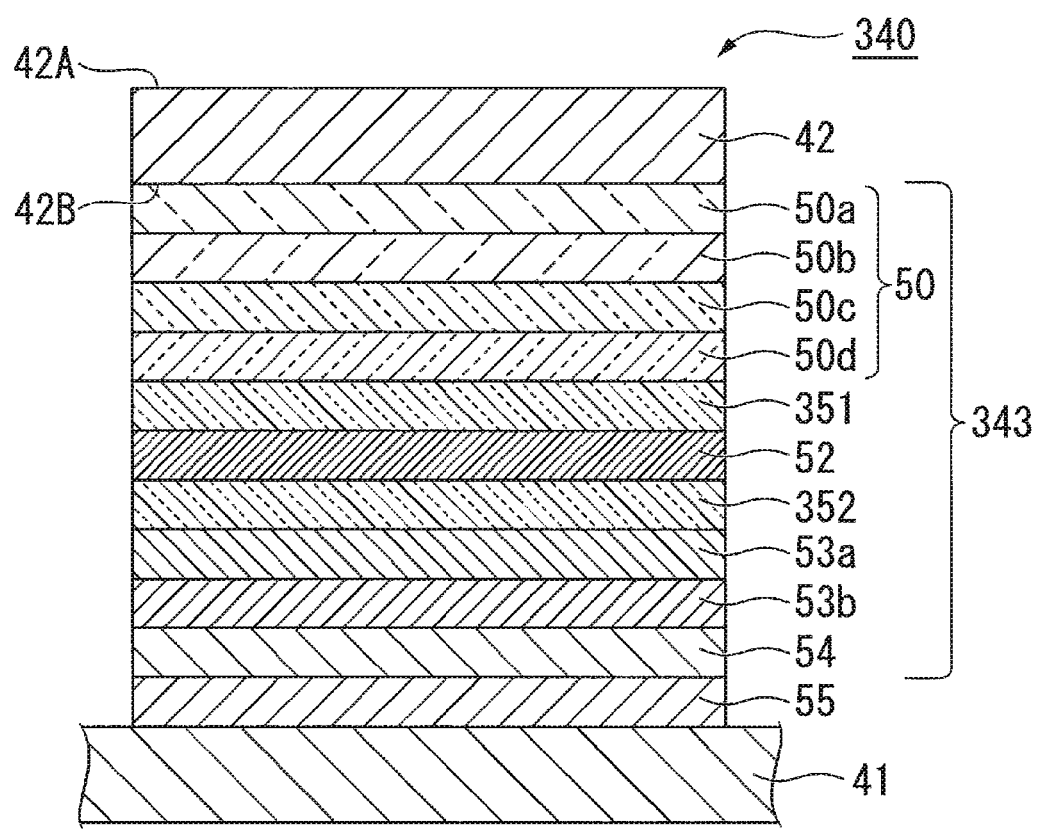
FIG. 8 is a cross-sectional view showing a configuration of a main portion of a wavelength conversion element according to a fourth embodiment.

FIG. 8 is a cross-sectional view showing a configuration of a main portion of a wavelength conversion element 340 according to this embodiment. Specifically, FIG. 8 is a view showing the cross section of a reflection member 343.

As shown in FIG. 8, the wavelength conversion element 340 includes the reflection member 343 which is provided between a first face 41a of a substrate 41 and a phosphor layer 42.

The reflection member 343 of this embodiment is constituted by stacking a multilayer film 50, a first deterioration prevention film 351, a reflection layer 52, a second deterioration prevention film 352, a first protective layer 53a, a second protective layer 53b, and a bonding assisting layer 54 in this order from the bottom face 42B side of the phosphor layer 42.

In this embodiment, each of the first deterioration prevention film 351 and the second deterioration prevention film 352 is composed of a layer containing a metal. The first deterioration prevention film 351 corresponds to the "second layer" described in the appended claims, and the second deterioration prevention film 352 corresponds to the "sixth layer" described in the appended claims.

In this embodiment, the first deterioration prevention film 351 and the second deterioration prevention film 352 contain at least one type of metal selected from, for example, ITO (indium tin oxide), FTO (fluorine-doped tin oxide, $SnO_2$:F), ATO (antimony-doped tin oxide, $SnO_2$:Sb), AZO (aluminum-doped zinc oxide, ZnO:Al), GZO (gallium-doped zinc oxide, ZnO:Ga), IZO (indium-doped zinc oxide), IGO (gallium-doped indium oxide), zinc oxide (ZnO), and tin oxide ($SnO_2$) as the electrically conductive oxide material or the amorphous electrically conductive oxide.

In this embodiment, as the materials of the first deterioration prevention film 351 and the second deterioration prevention film 352, ITO was used. The materials of the first deterioration prevention film 351 and the second deterioration prevention film 352 may be different from each other.

In this embodiment, the reflection layer 52 is provided with an ITO film on the light incident side and the light emission side, and therefore, migration of Ag atoms is less likely to occur. Accordingly, as compared with the configuration of the second embodiment, the occurrence of aggregation due to migration is further reduced.

In the wavelength conversion element 340 of this embodiment, a decrease in the extraction efficiency of the fluorescence YL is more easily suppressed.

The invention is not limited to the contents of the above-mentioned embodiments and appropriate modifications are possible without departing from the gist of the invention.

For example, in the above-mentioned embodiments, as the deterioration prevention film 51, the first deterioration prevention film 251, and the second deterioration prevention film 252 containing a metal, those containing at least one type of metal selected from Al, Ni, Ti, W, and Nb are exemplified, however, the invention is not limited thereto. For example, as the deterioration prevention film 51, the first deterioration prevention film 251, and the second deterioration prevention film 252, those containing at least one type of metal (alloy) selected from a Zn—Ag alloy and a Sn—Ag alloy may be used.

In the above-mentioned first embodiment, a layer composed of the same material as that of the deterioration prevention film 51 may be disposed between the second protective layer 53b and the bonding assisting layer 54 composed of an Ag layer.

In the above-mentioned second embodiment, a layer composed of the same material as that of the deterioration prevention film 151 may be disposed between the second protective layer 53b and the bonding assisting layer 54 composed of an Ag layer.

In the above-mentioned third embodiment, a layer composed of the same material as either the material of the first deterioration prevention film 251 or the material of the second deterioration prevention film 252 may be disposed between the second protective layer 53b and the bonding assisting layer 54 composed of an Ag layer.

In the above-mentioned fourth embodiment, a layer composed of the same material as either the material of the first deterioration prevention film 351 or the material of the second deterioration prevention film 352 may be disposed between the second protective layer 53b and the bonding assisting layer 54 composed of an Ag layer.

Further, in the above-mentioned embodiments, an example in which the light source device according to the invention is mounted on the projector is shown, however, the invention is not limited thereto. The light source device according to the invention can be applied also to a lighting device, an automobile headlight, etc.

EXAMPLES

The present inventor performed an experiment for confirming the effectiveness of the invention by comparison between Examples and Comparative Example. In Example 1, the experiment was performed using a unit in which a glass substrate was used in place of a phosphor, and a reflection member is formed on one face of the glass substrate as a sample.

As the sample, a unit having a configuration, in which an Ag film was used as the reflection layer constituting the reflection member, a layer composed of Al was used as the deterioration prevention film, and as the other layers (the multilayer film, the first protective layer, the second protective layer, and the bonding assisting layer), the same layers as in the above-mentioned embodiments were used, was used. The deterioration prevention film was formed to have a thickness of about 1 nm.

In Example 2, a unit having the same configuration as in Example 1 except that the deterioration prevention film was composed of Ti was used as a sample.

In Comparative Example, a unit in which the deterioration prevention film was omitted from the configuration of the above-mentioned Examples 1 and 2 was used as a sample.

With respect to each of the samples of Examples 1 and 2 and Comparative Example, a light having the same wavelength band as that of an excitation light was irradiated from the other face side (on the opposite side to the face on which the reflection member was provided) of the glass substrate for 15 hours under the condition of 40 W/mm$^2$, and thereafter, the reflectance of the reflection member (reflection layer) was measured for each sample, and the results are shown in the following Table 1. The reflectance was measured for each of the three wavelengths (blue: 465 nm, green: 530 nm, and red: 615 nm), and a reflectance retention ratio was calculated. The reflectance retention ratio is a ratio of a reflectance at the end of the experiment (after the elapse of 15 hours) to a reflectance at the start of the experiment. That is, the result that the reflectance retention ratio is 100% means that the reflection layer is not deteriorated at all.

TABLE 1

| | Reflectance retention ratio | | |
|---|---|---|---|
| Wavelength | Example 1 | Example 2 | Comparative Example |
| 465 nm | 100% | 100% | 98.5% |
| 530 nm | 100% | 100% | 99.0% |
| 615 nm | 100% | 100% | 97.1% |

As shown in Table 1, it could be confirmed that in Comparative Example, the reflectance retention ratio is lower than 100% at each wavelength. On the other hand, it could be confirmed that in Examples 1 and 2, the reflectance retention ratio can be maintained at 100% at each wavelength. That is, it was confirmed that in Examples 1 and 2 using the deterioration prevention film, the reflection performance of the reflection layer can be maintained as compared with Comparative Example. Accordingly, it was confirmed that the deterioration of the reflection layer due to an excitation light can be suppressed by using the deterioration prevention film.

Further, after each of the samples of Examples 1 and 2 and Comparative Example was left in an environment at 350° C. for 72 hours, the reflectance of the reflection member (reflection layer) was measured for each sample, and the results of calculation of the reflectance retention ratio are shown in the following Table 2. The reflectance retention ratio was calculated for each of the three wavelengths (blue: 465 nm, green: 530 nm, and red: 615 nm).

TABLE 2

| | Reflectance retention ratio | | |
|---|---|---|---|
| Wavelength | Example 1 | Example 2 | Comparative Example |
| 465 nm | 97.0% | 100.0% | 91.7% |
| 530 nm | 99.4% | 100.0% | 95.7% |
| 615 nm | 100.0% | 100.0% | 97.4% |

As shown in Table 2, it could be confirmed that in Comparative Example, the reflectance retention ratio is lower than in Examples 1 and 2 at each wavelength. Further, it could be confirmed that in Example 2, the reflectance retention ratio can be maintained at 100% at each wavelength.

That is, it was confirmed that in Examples 1 and 2 using the deterioration prevention film, the reflection performance of the reflection layer can be maintained as compared with Comparative Example. Accordingly, it was confirmed that the deterioration of the reflection layer due to heat can be suppressed by using the deterioration prevention film. In addition, it could be confirmed that the heat resistance of the reflection layer is further improved by using Ti as the deterioration prevention film.

The entire disclosure of Japanese Patent Application No. 2017-150599, filed on Aug. 3, 2017 and Japanese Patent Application No. 2017-247872, filed on Dec. 25, 2017 are expressly incorporated by reference herein.

What is claimed is:

1. A wavelength conversion element, comprising:
a wavelength conversion layer which has a first face on which an excitation light is incident and a second face facing the first face;
a first layer which is provided facing the second face and contains a first inorganic oxide;
a second layer which is provided facing the first layer and contains a first metal or a second inorganic oxide that is different from the first inorganic oxide; and
a third layer which is provided facing the second layer, contains either silver or aluminum, and reflects the excitation light or a light obtained by wavelength conversion of the excitation light by the wavelength conversion layer, wherein
the wavelength conversion layer includes a pore inside, the second face has a recess, and
a part of the first layer is provided in the recess.

2. The wavelength conversion element according to claim 1, further comprising:

a fourth layer which is provided facing the third layer and contains the first metal or a second metal that is different from the first metal; and a fifth layer which is provided facing the fourth layer and contains the first inorganic oxide or the second inorganic oxide.

3. The wavelength conversion element according to claim 2, wherein
the wavelength conversion element further comprises a substrate, and
the fifth layer and the substrate are bonded to each other by a bonding material provided between the fifth layer and the substrate.

4. The wavelength conversion element according to claim 2, further comprising a sixth layer which contains the first metal or the second inorganic oxide between the third layer and the fourth layer.

5. The wavelength conversion element according to claim 4, wherein
the first metal of the sixth layer is at least one metal selected from Al, Ni, Ti, W, and Nb.

6. The wavelength conversion element according to claim 4, wherein
the second inorganic oxide of the sixth layer is an electrically conductive oxide material or an amorphous electrically conductive oxide.

7. The wavelength conversion element according to claim 1, wherein
the first metal of the second layer is at least one metal selected from Al, Ni, Ti, W, and Nb.

8. The wavelength conversion element according to claim 1, wherein
the second inorganic oxide of the second layer is an electrically conductive oxide material or an amorphous electrically conductive oxide.

9. A light source device, comprising:
the wavelength conversion element according to claim 1; and
a light source which emits the excitation light.

10. A projector, comprising:
the light source device according to claim 9;
a light modulator which modulates a light from the light source device in accordance with image information to form an image light; and
a projection optical system which projects the image light.

11. A wavelength conversion element, comprising:
a wavelength conversion layer which has a first face on which an excitation light is incident and a second face facing the first face;
a first layer which is provided facing the second face and contains a first inorganic oxide;
a second layer which is provided facing the first layer and contains tin oxide, the first layer being provided between the second face and the second layer; and
a third layer which is provided facing the second layer, contains either silver or aluminum, and reflects the excitation light or a light obtained by wavelength conversion of the excitation light by the wavelength conversion layer, wherein
the wavelength conversion layer includes a pore inside,
the second face has a recess, and
a part of the first layer is provided in the recess.

12. The wavelength conversion element according to claim 11,
the third layer is provided in direct contact with the second layer.

13. The wavelength conversion element according to claim 11, further comprising:
a fourth layer which is provided facing the third layer and contains a second inorganic oxide that is different from the first inorganic oxide.

14. The wavelength conversion element according to claim 13, wherein
the second inorganic oxide of the fourth layer is tin oxide.

15. A light source device, comprising:
the wavelength conversion element according to claim 11; and
a light source which emits the excitation light.

16. A projector, comprising:
the light source device according to claim 15;
a light modulator which modulates a light from the light source device in accordance with image information to form an image light; and
a projection optical system which projects the image light.

17. The wavelength conversion element according to claim 11, wherein
the first layer includes a plurality of films, and
a first film of the plurality of films is in direct contact with the second face and contains silicon dioxide.

18. The wavelength conversion element according to claim 11, wherein a film thickness of the second layer is greater than or equal to 1 nm and is less than or equal to 20 nm.

* * * * *